United States Patent
He et al.

(10) Patent No.: US 11,423,241 B2
(45) Date of Patent: Aug. 23, 2022

(54) METHOD AND SYSTEM FOR VEHICLE-LOADING WAREHOUSING ASSET MANAGEMENT BASED ON ULTRA HIGH FREQUENCY RADIO FREQUENCY IDENTIFICATION PATH LOSS MODEL

(71) Applicant: WUHAN UNIVERSITY, Hubei (CN)

(72) Inventors: Yigang He, Hubei (CN); Guolong Shi, Hubei (CN); Liulu He, Hubei (CN)

(73) Assignee: WUHAN UNIVERSITY, Hubei (CN)

(*) Notice: Subject to any disclaimer, the term of this patent is extended or adjusted under 35 U.S.C. 154(b) by 113 days.

(21) Appl. No.: 17/065,529

(22) Filed: Oct. 8, 2020

(65) Prior Publication Data

US 2021/0150161 A1     May 20, 2021

(30) Foreign Application Priority Data

Nov. 15, 2019  (CN) ........................... 201911117935.7

(51) Int. Cl.
    *G06K 7/10*     (2006.01)
    *G06K 19/07*    (2006.01)
    *G06Q 10/08*    (2012.01)

(52) U.S. Cl.
    CPC ..... *G06K 7/10445* (2013.01); *G06K 19/0725* (2013.01); *G06Q 10/087* (2013.01)

(58) Field of Classification Search
    CPC ................................................. G06K 7/10445
    See application file for complete search history.

(56) References Cited

U.S. PATENT DOCUMENTS

| | | | | |
|---|---|---|---|---|
| 2008/0129453 A1* | 6/2008 | Shanks | ................ | G06K 7/0008 342/350 |
| 2009/0309706 A1* | 12/2009 | Mukherjee | ........... | H04B 5/0062 340/10.1 |
| 2011/0148584 A1* | 6/2011 | Lee | ..................... | G06K 19/0723 340/10.1 |
| 2012/0126954 A1* | 5/2012 | Kail | ................... | G06K 7/10356 340/10.6 |
| 2014/0152507 A1* | 6/2014 | McAllister | ......... | G06K 7/10376 342/126 |
| 2018/0005103 A1* | 1/2018 | Hungate | .......... | G06K 19/07783 |
| 2020/0158910 A1* | 5/2020 | Tietsworth | ........... | G01R 29/085 |

* cited by examiner

Primary Examiner — Joseph H Feild
Assistant Examiner — Pameshanand Mahase
(74) Attorney, Agent, or Firm — JCIPRNET

(57) ABSTRACT

A method for vehicle-loading warehousing asset management based on an ultra-high frequency (UHF) radio frequency identification (RFID) path loss model, which includes the following steps. An electromagnetic wave is emitted by a tag reader. The electromagnetic wave is diffracted, reflected, and scattered when passing through a warehousing vehicle hood, and the electromagnetic wave is emitted and scattered through the ground. A UHF RFID tag attached to a front surface location region of assets receives electromagnetic waves of various paths emitted by the tag reader. The tag reader reads UHF RFID tag information. A transfer function of a tag receiving signal is constructed according to the tag information, and a path loss function during a UHF RFID tag sensing electromagnetic wave process is constructed according to the transfer function. The path loss is calculated according to the constructed path loss function. A location of the UHF RFID tag is obtained.

10 Claims, 2 Drawing Sheets

METHOD AND SYSTEM FOR VEHICLE-LOADING WAREHOUSING ASSET MANAGEMENT BASED ON ULTRA HIGH FREQUENCY RADIO FREQUENCY IDENTIFICATION PATH LOSS MODEL

CROSS-REFERENCE TO RELATED APPLICATION

This application claims the priority benefit of China application serial no. 201911117935.7, filed on Nov. 15, 2019. The entirety of the above-mentioned patent application is hereby incorporated by reference herein and made a part of this specification.

BACKGROUND

Technical Field

The disclosure integrates the propagation theory of geometric characteristic of direct, refractive, diffractive, and scattered electromagnetic waves, height difference factor, and obstacle loss factor to construct an ultra-high frequency (UHF) radio frequency identification (RFID) path loss model, and specifically relates to a method for vehicle-loading warehousing asset management based on the UHF RFID path loss model.

Description of Related Art

Asset management based on RFID is a typical application scenario of the Internet of Things. Due to the fast update speed of equipment, the maintenance and management of asset operation conditions directly affect the operation and development of enterprises. Stricter and standardized tracking management of various assets may be implemented through radio frequency (RF) tags, which greatly improves the efficiency and accuracy of asset information acquisition. There are many factors that affect the identification of RF tags, such as the type of tags, the number of tags, the geometric characteristics of the environment, and the location of tags. Therefore, it is necessary to construct and analyze the RFID path loss model for asset storage scenarios.

The warehousing scenario of vehicle-loading assets is different from other open or semi-open environments. There are usually obstacles such as walls, roofs, ground, and vehicles. The wireless communication efficiency of the storage scenario of equipment is affected by direct, refractive, diffractive, scattered, absorption of, and polarization of electromagnetic waves. In order to comprehensively analyze the path loss during the tag identification process, the geometric characteristics of the environment, the type of tags, the location of tags, obstacles, and other factors should be fully considered.

SUMMARY

The disclosure provides a method for vehicle-loading warehousing asset management based on an ultra-high frequency (UHF) radio frequency identification (RFID) path loss model to achieve the goals of high-efficiency transmission of supply information, implementation of supply life cycle management, automatic identification, etc. in view of the defect of low efficiency of radio frequency (RF) tag identification during warehousing of vehicle-loading assets in the prior art.

The technical solutions adopted by the disclosure to solve the technical issues are as follows.

A method for vehicle-loading warehousing asset management based on UHF RFID path loss model is provided, which includes the following steps.

An electromagnetic wave is emitted by a tag reader. The electromagnetic wave is diffracted, reflected, and scattered when passing through a warehousing vehicle hood, and the electromagnetic wave is emitted and scattered through the ground.

A UHF RFID tag attached to a front surface location region of assets loaded by a warehousing vehicle receives an electromagnetic wave of a direct path and electromagnetic waves of a ground reflection path, a ground scattering path, a hood diffraction path, a hood reflection path, and a hood scattering path emitted by the tag reader.

The tag reader reads tag information from the UHF RFID tag.

A transfer function of a tag receiving signal is constructed according to the tag information, and a path loss function during a UHF RFID tag sensing electromagnetic wave process is constructed according to the transfer function. The path loss function includes each path loss and obstacle loss in a path when the tag reader and the UHF RFID tag are located at different levels.

The path loss is calculated according to the constructed path loss function. A location of the UHF RFID tag is obtained.

Following the above technical solution, the UHF RFID tag is an active UHF RF tag.

Following the above technical solution, the constructed transfer function $G(f, d_i)$ of the tag receiving signal is:

$$G(f,d_i)=G_1(f,d_d)+G_{21}(f,d_{gr})+G_{22}(f,d_{gs})+G_{31}(f,d_{cd})+G_{32}(f,d_{cr})+G_{33}(f,d_{cs})$$

where, $G_1(f, d_d)$ is the transfer function of the direct path, and $d_d$ is the propagation distance of the direct path; $G_{21}(f, d_{gr})$ is the transfer function of the ground reflection path, and $d_{gr}$ is the propagation distance of the ground reflection path; $G_{22}(f, d_{gs})$ is the transfer function of the ground scattering path, and $d_{gs}$ is the transmission distance of the ground scattering path; and $G_{31}(f, d_{cd})$ is the transfer function of the diffraction path of the vehicle hood, $d_{cd}$ is the transmission distance of the diffraction path of the vehicle hood, $G_{32}(f, d_{cr})$ is the transfer function of the reflection path of the vehicle hood, $d_{cr}$ is the transmission distance of the reflection path of the vehicle hood, $G_{33}(f, d_{cs})$ is the transfer function of the scattering path of the vehicle hood, and $d_{cs}$ is the transmission distance of the scattering path of the vehicle hood.

Following the above technical solution, the constructed path loss function is:

$$P_L(H-H_c)=P_L(h_0)+10nlg[(H-H_c)/h_0]+X_\theta+\Sigma OLF$$

where, H is the height of the tag reader from the ground, Hc is the height of the UHF RFID tag from the ground, n represents the path loss coefficient when the tag reader and the UHF RFID tag are located at the same level, $P_L(h_0)$ represents the reference path loss when the height difference between the tag reader and the UHF RFID tag is $h_0$, $h_0$ is the default setting value, $X_\theta$ is the average value of θ, the standard difference θ describes the shadow effect, which is a random variable conforming to the Gaussian distribution, and OLF is the loss caused by an obstacle during the propagation process of the electromagnetic wave.

Following the above technical solution, the UHF RFID tag in the front surface location region is distributed in a matrix.

The disclosure also provides a system for vehicle-loading warehousing asset management based on a UHF RFID path loss model, which includes the following.

A tag reader emits an electromagnetic wave and reads tag information of a UHF RFID tag. The electromagnetic wave is diffracted, reflected, and scattered when passing through a warehousing vehicle hood, and the electromagnetic wave is emitted and scattered through the ground.

A UHF RFID tag is attached to a front surface location region of assets loaded by a warehousing vehicle and receives an electromagnetic wave of a direct path and electromagnetic waves of a ground reflection path, a ground scattering path, a hood diffraction path, a hood reflection path, and a hood scattering path emitted by the tag reader.

A signal transfer function construction unit is configured to construct a transfer function of a tag receiving signal according to the tag information.

A path loss function construction unit is configured to construct a path loss function during a UHF RFID tag sensing electromagnetic wave process according to the transfer function. The path loss function includes each path loss and obstacle loss in a path when the tag reader and the UHF RFID tag are located at different levels.

A UHF RFID tag location calculation unit is configured to calculate the path loss according to the constructed path loss function, and then calculate a location of the UHF RFID tag according to the path loss.

Following the above technical solution, the UHF RFID tag is an active UHF RF tag.

Following the above technical solution, the transfer function $G(f, d_i)$ of the tag receiving signal constructed by the signal transfer function construction unit is:

$$G(f,d_i)=G_1(f,d_d)+G_{21}(f,d_{gr})+G_{22}(f,d_{gs})+G_{31}(f,d_{cd})+G_{32}(f,d_{cr})+G_{33}(f,d_{cs})$$

where, $G_1(f, d_d)$ is the transfer function of the direct path, and $d_d$ is the propagation distance of the direct path; $G_{21}(f, d_{gr})$ is the transfer function of the ground reflection path, and $d_{gr}$ is the propagation distance of the ground reflection path; $G_{22}(f, d_{gs})$ is the transfer function of the ground scattering path, and $d_{gs}$ is the transmission distance of the ground scattering path; and $G_{31}(f, d_{cd})$ is the transfer function of the diffraction path of the vehicle hood, $d_{cd}$ is the transmission distance of the diffraction path of the vehicle hood, $G_{32}(f, d_{cr})$ is the transfer function of the reflection path of the vehicle hood, $d_{cr}$ is the transmission distance of the reflection path of the vehicle hood, $G_{33}(f, d_{cs})$ is the transfer function of the scattering path of the vehicle hood, and $d_{cs}$ is the transmission distance of the scattering path of the vehicle hood.

Following the above technical solution, the path loss function constructed by the path loss function construction unit is:

$$P_L(H-H_c)=P_L(h_0)+10n\lg[(H-H_c)/h_0]+X_\theta+\Sigma OLF$$

where, H is the height of the tag reader from the ground, Hc is the height of the UHF RFID tag from the ground, n represents the path loss coefficient when the tag reader and the UHF RFID tag are located at the same level, $P_L(h_0)$ represents the reference path loss when the height difference between the tag reader and the UHF RFID tag is $h_0$, $h_0$ is the default setting value, $X_\theta$ is the average value of $\theta$, the standard difference $\theta$ describes the shadow effect, which is a random variable conforming to the Gaussian distribution, and OLF is the loss caused by an obstacle during the propagation process of the electromagnetic wave.

Following the above technical solution, the UHF RFID tag in the front surface location region is distributed in a matrix.

BRIEF DESCRIPTION OF THE DRAWINGS

The disclosure will be further described below in conjunction with the accompanying drawings and embodiments.

DETAILED DESCRIPTION OF DISCLOSED EMBODIMENTS

The beneficial effects of the disclosure are: the method and the system for vehicle-loading warehousing asset management based on the UHF RFID path loss model of the disclosure introduces the height difference factor and the obstacle loss factor to construct the UHF RFID path loss model. The path loss model optimizes the wireless sensing path of the RF tag, which can effectively evaluate the optimal location of the UHF RFID tag, improve the inventory efficiency of vehicle-loading warehousing assets, and eventually achieve accurate and rapid transmission of supply information to implement goals such as the dynamic management and automatic identification of supply.

Furthermore, the disclosure is based on the two-dimensional spatial geometric characteristics of the vehicle-loading warehousing, whose factors are more abundant compared with the traditional path loss evaluation model. The UHF RFID tag attachment region is distributed in a matrix, which increases the spatial correlation of the path loss evaluation model.

In order for the objectives, technical solutions, and advantages of the disclosure to be clearer, the disclosure is further described in detail below with reference to the accompanying drawings and embodiments. It should be understood that the specific embodiments described here are only configured to explain the disclosure, but not to limit the disclosure.

Figure 1:
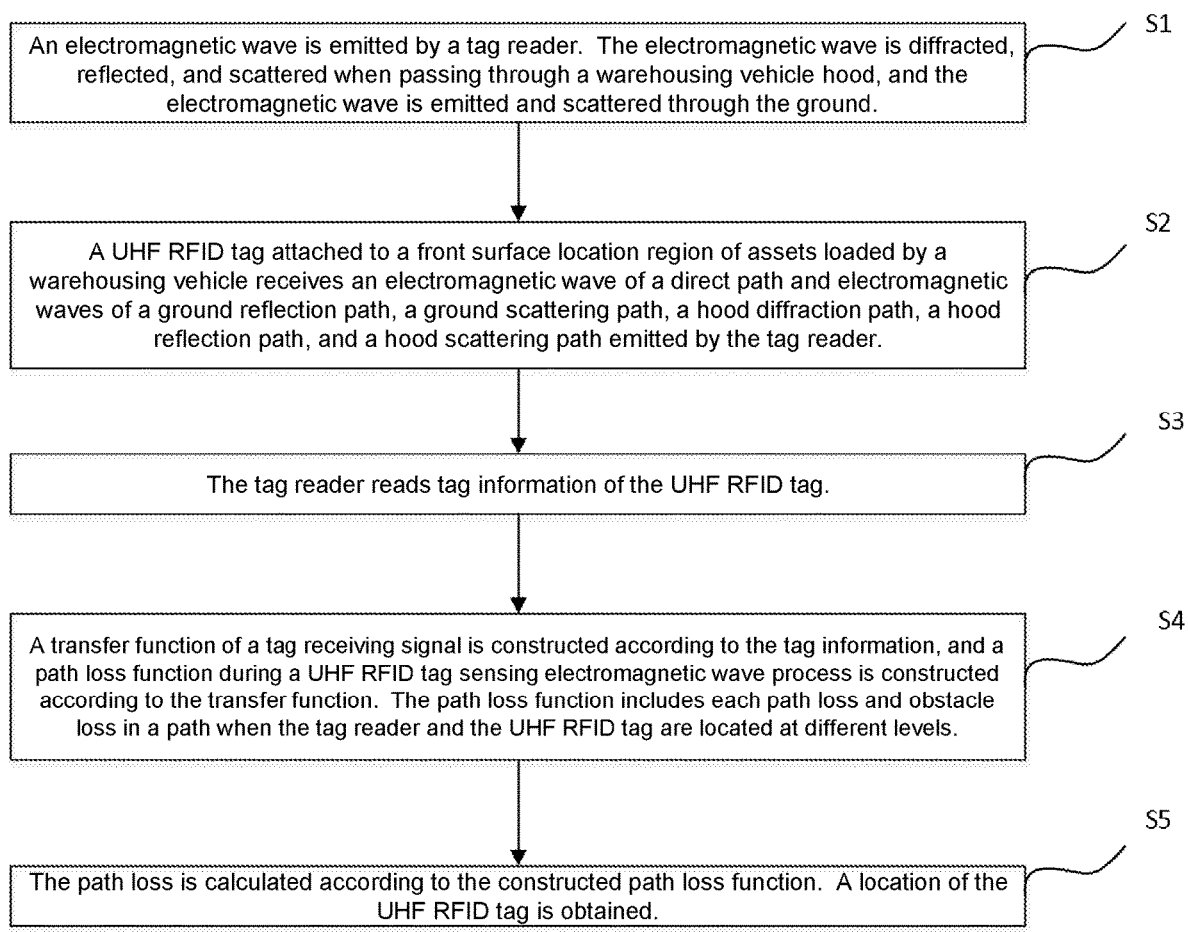
FIG. 1 is a flowchart of a method for vehicle-loading warehousing asset management based on an ultra-high frequency (UHF) radio frequency identification (RFID) path loss model according to an embodiment of the disclosure.

As shown in FIG. 1, a method for vehicle-loading warehousing asset management based on an ultra-high frequency (UHF) radio frequency identification (RFID) path loss model of the disclosure includes the following steps.

Step S1. An electromagnetic wave is emitted by a tag reader. The electromagnetic wave is diffracted, reflected, and scattered when passing through a warehousing vehicle hood, and the electromagnetic wave is emitted and scattered through the ground.

Step S2. A UHF RFID tag attached to a front surface location region of assets loaded by a warehousing vehicle receives an electromagnetic wave of a direct path and electromagnetic waves of a ground reflection path, a ground scattering path, a hood diffraction path, a hood reflection path, and a hood scattering path emitted by the tag reader.

Step S3. The tag reader reads tag information of the UHF RFID tag.

Step S4. A transfer function of a tag receiving signal is constructed according to the tag information, and a path loss function during a UHF RFID tag sensing electromagnetic wave process is constructed according to the transfer function. The path loss function includes each path loss and obstacle loss in a path when the tag reader and the UHF RFID tag are located at different levels.

Step S5. The path loss is calculated according to the constructed path loss function. A location of the UHF RFID tag is obtained.

Figure 2:
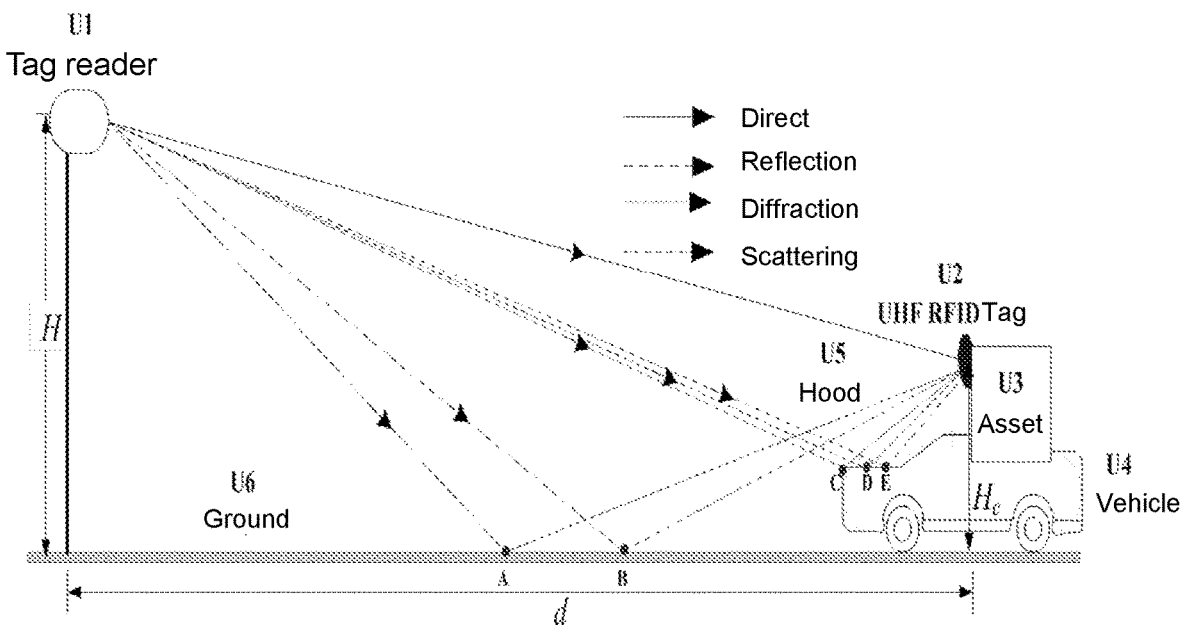
FIG. 2 is a ray path view of vehicle-loading warehousing of assets.

Referring to FIG. 2, the UHF RFID path loss evaluation model design for vehicle-loading warehousing asset management according to the embodiment of the disclosure includes a tag reader U1, a UHF RFID tag U2, an asset U3, a vehicle U4, a hood U5, and a ground U6.

The height difference between the tag reader U1 and the ground U6 is H. The height difference between the UHF RFID tag U2 and the ground U6 is $H_c$. The UHF RFID tag U2 is attached to the surface of the asset U3. The asset U3 is located behind the cab of the vehicle U4. Points A and B respectively represent the reflection point and the scattering point of the electromagnetic wave passing through the ground U6. Points C, D, and E respectively represent the diffraction point, the reflection point, and the scattering point of the electromagnetic wave passing through the hood U5.

The tag reader U1 is configured to read the information of the UHF RFID tag U2. The height H may be dynamically adjusted. d is the horizontal distance between the tag reader U1 and the UHF RFID tag U2.

The UHF RFID tag U2 is an active UHF radio frequency (RF) tag. Please refer to FIG. 3 for the distribution of the UHF RFID tags U2 attached to the front surface location region of the asset U3, which is a 3*3 matrix distribution. The location regions for attaching the tags are respectively U21, U22, U23, ..., U29. The height $H_c$ changes with the location for attaching the tag.

The front surface portion of the asset U3 is partially exposed above the vehicle U4, that is, there is a line-of-sight path between the tag reader U1 and the UHF RFID tag U2.

The hood U5 has a rough metal surface. The electromagnetic wave is diffracted, reflected, and scattered when passing through the hood U5. There are line-of-sight paths between a diffraction point C, a reflection point D, and a scattering point E when the electromagnetic wave passes through the hood U5 and before the UHF RFID tag U2.

The ground U6 is a rough ground. The electromagnetic wave is reflected and scattered through the ground.

The different locational relationship between the tag reader U1 and the UHF RFID tag U2 may lead to different propagation results. The electromagnetic wave path loss evaluation model takes into account the reflection, diffraction, and scattering paths caused by the hood U5. The influence of the scattering path caused by the rough ground U6 on the received signal is also taken into account during the research process.

A UHF RFID tag U2 receiving signal is composed of a direct path, a ground U6 reflection path, a ground U6 scattering path, a hood U5 diffraction path, a hood U5 reflection path, and a hood U5 scattering path.

A transfer function $G(f, d_i)$ of the UHF RFID tag U2 receiving signal is described as:

$$G(f,d_i)=G_1(f,d_d)\pm G_{21}(f,d_{gr})+G_{22}(f,d_{gs})+G_{31}(f,d_{cd})+G_{32}(f,d_{cr})+G_{33}(f,d_{cs})$$

where, $G_1(f, d_d)$ is the transfer function of the direct path, and $d_d$ is the propagation distance of the direct path; $G_{21}(f, d_{gr})$ is the transfer function of the ground U6 reflection path, and $d_{gr}$ is the propagation distance of the reflection path; $G_{22}(f, d_{gs})$ is the transfer function of the ground U6 scattering path, $d_{gs}$ is the transmission distance of the scattering path, and assuming that the wireless channel parameters of the s-th ray are $\{S, a_s, \phi_s, \Omega T_{i,s}, \Omega_{R,s}\}$, where S is the numbering of the path, $a_s$ is the amplitude of the scattering path, $\phi_s$ is the path arrival time, $\Omega_{T,s}$ is the ray emission direction, and $\Omega_{R,s}$ is the ray arrival direction; $G_{31}(f, d_{cd})$ is the transfer function of the diffraction path of the vehicle hood U5, and $d_{cd}$ is the transmission distance of the diffraction path; $G_{32}(f, d_{cr})$ is the transfer function of the reflection path of the vehicle hood U5, and $d_{cr}$ is the transmission distance of the reflection path; and $G_{33}(f, d_{cs})$ is the transfer function of the scattering path of the vehicle hood U5, and $d_{cs}$ is the transmission distance of the scattering path.

where, $G_1(f, d_d)$, $G_{21}(f, d_{gr})$, and $G_{32}(f, d_{cr})$ may be expressed as:

$$G_1(f, d_d) = \frac{\lambda}{4\pi d_d}\exp(-jkd_d)$$

$$G_{21}(f, d_{gr}) = \frac{\lambda}{4\pi d_{gr}}C_{gr}\exp(-jkd_{gr})$$

$$G_{32}(f, d_{cr}) = \frac{\lambda}{4\pi d_{cr}}C_{cr}\exp(-jkd_{cr})$$

where, $\lambda$ represents the wavelength, k represents the number of electromagnetic wave propagation paths, and $C_{gr}$ and $C_{cr}$ respectively represent the reflection coefficients of the ground U6 and the surface of the vehicle hood U5.

$$C_{gr} = \frac{\cos\theta_1 - \alpha_1 t_1}{\cos\theta_1 + \alpha_1 t_1}$$

$$C_{cr} = \frac{\cos\theta_2 - \alpha_2 t_2}{\cos\theta_2 + \alpha_2 t_2}$$

where, $\theta_i$ represents the occurrence angle, $\eta_{gr}$ represents the relative impedance reflected by the ground U6, $\eta_{cr}$ represents the relative impedance reflected by the surface of the vehicle hood U5. In the horizontal and vertical cases, $\alpha_1$ is respectively 1 or $1/\eta_{gr}^2$, and $\alpha_2$ is respectively 1 or $1/\eta_{cr}^2$.

$$t_1 = \sqrt{\eta_{gr}^2 - \sin^2\theta_1}$$

$$t_2 = \sqrt{\eta_{cr}^2 - \sin^2\theta_2}$$

A UHF RFID path loss $P_L$ for the vehicle-loading warehousing asset management may be defined as:

$$P_L = -20\lg|G_1(f,d_d)+G_{21}(f,d_{gr})+G_{22}(f,d_{gs})+G_{31}(f,d_{cd})+G_{32}(f,d_{cr})+G_{33}(f,d_{cs})|$$

In a general long-distance wireless communication scenario, the change in the height difference between the tag reader U1 and the ground U6 being H−Hc does not affect the average value of the path loss. However, in short-distance scenarios such as the vehicle-loading warehousing asset management, the change in the height difference H−Hc significantly affects the path loss of the electromagnetic wave. In order to accurately describe the path loss of the UHF RFID sensing process, the variable factor of the tag antenna height should be considered. The path loss is defined as:

$$P_L(H-H_c)=P_L(h_0)+10n\lg[(H-H_c)/h_0]+X_\theta$$

where, n represents the path loss coefficient when the tag reader U1 and the UHF RFID tag U2 are at the same level, $P_L(h_0)$ represents the reference path loss when the height difference between the tag reader U1 and the UHF RFID tag U2 is $h_0$, where the default setting of $h_0$ is 2m, $X_\theta$ is the average value of θ, the standard difference θ describes the shadow effect, which is a random variable conforming to the Gaussian distribution. After introducing the obstacle loss factor OLF, the model may be further optimized into:

$$P_L(H-H_c)=P_L(h_0)+10n\lg[(H-H_c)/h_0]+X_\theta+\Sigma OLF$$

The obstacle loss factor OLF describes the loss caused by obstacles during the propagation process of the electromagnetic wave.

The path loss increases with the increase of a horizontal distance d between the tag reader U1 and the UHF RFID tag U2. At the same time, the path loss is affected by the geometric characteristics of the surrounding environment, material media, and other factors. A path loss index n and a standard deviation θ may be estimated through the linear fitting of the test data.

Figure 3:
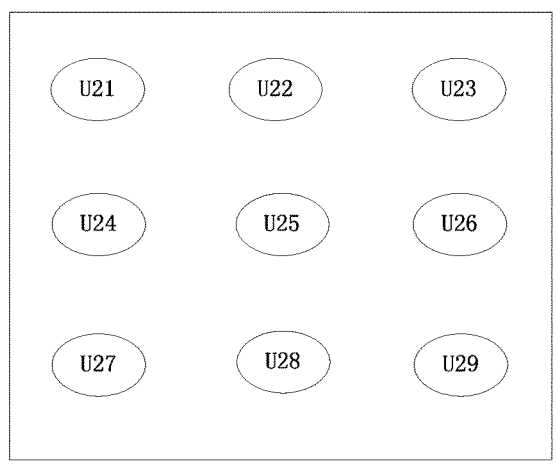
FIG. 3 is a schematic view of a matrix distribution of UHF RFID tag locations.

Referring to FIG. 3, the path loss of the UHF RFID tags U2 attached to different locations on the front surface of the asset U3 may be defined as:

$$\begin{bmatrix} P_{LU21} = -20\lg|G_{U21}(f,d_i)| + P_L(h_0) + 10n\lg[(H-H_{cu21})/h_0] + X_\theta \\ P_{LU22} = -20\lg|G_{U22}(f,d_i)| + P_L(h_0) + 10n\lg[(H-H_{cu22})/h_0] + X_\theta \\ \ldots \\ P_{LU29} = -20\lg|G_{U29}(f,d_i)| + P_L(h_0) + 10n\lg[(H-H_{cu29})/h_0] + X_\theta \end{bmatrix}$$

The system for vehicle-loading warehousing asset management based on the UHF RFID path loss model according to the embodiment of the disclosure may implement the path loss evaluation method of the foregoing embodiment. The system specifically includes the following.

A tag reader emits an electromagnetic wave and reads tag information of a UHF RFID tag. The electromagnetic wave is diffracted, reflected, and scattered when passing through a warehousing vehicle hood, and the electromagnetic wave is emitted and scattered through the ground.

A UHF RFID tag is attached to a front surface location region of assets loaded by a warehousing vehicle and receives an electromagnetic wave of a direct path and electromagnetic waves of a ground reflection path, a ground scattering path, a hood diffraction path, a hood reflection path, and a hood scattering path emitted by the tag reader.

A signal transfer function construction unit is configured to construct a transfer function of a tag receiving signal according to the tag information.

A path loss function construction unit is configured to construct a path loss function during a UHF RFID tag sensing electromagnetic wave process according to the transfer function. The path loss function includes each path loss and obstacle loss in a path when the tag reader and the UHF RFID tag are located at different levels.

A UHF RFID tag location calculation unit is configured to calculate the path loss according to the constructed path loss function, and then calculate a location of the UHF RFID tag according to the path loss.

The UHF RFID tag may be an active UHF RF tag.

Further, in the embodiment of the disclosure, the transfer function G(f, $d_i$) of the tag receiving signal constructed by the signal transfer function construction unit is:

$$G(f,d_i)=G_1(f,d_d)+G_{21}(f,d_{gr})+G_{22}(f,d_{gs})+G_{31}(f,d_{cd})+G_{32}(f,d_{cr})+G_{33}(f,d_{cs})$$

where, $G_1(f, d_d)$ is the transfer function of the direct path, and $d_d$ is the propagation distance of the direct path; $G_{21}(f, d_{gr})$ is the transfer function of the ground reflection path, and $d_{gr}$ is the propagation distance of the ground reflection path; $G_{22}(f, d_{gs})$ is the transfer function of the ground scattering path, and $d_{gs}$ is the transmission distance of the ground scattering path; and $G_{31}(f, d_{cd})$ is the transfer function of the diffraction path of the vehicle hood, $d_{cd}$ is the transmission distance of the diffraction path of the vehicle hood, $G_{32}(f, d_{cr})$ is the transfer function of the reflection path of the vehicle hood, $d_{cr}$ is the transmission distance of the reflection path of the vehicle hood, $G_{33}(f, d_{cs})$ is the transfer function of the scattering path of the vehicle hood, and $d_{cs}$ is the transmission distance of the scattering path of the vehicle hood.

Further, the path loss function constructed by the path loss function construction unit is:

$$P_L(H-H_c)=P_L(h_0)+10n\lg[(H-H_c)/h_0]+X_\theta+\Sigma OLF$$

where, H is the height of the tag reader from the ground, Hc is the height of the UHF RFID tag from the ground, n represents the path loss coefficient when the tag reader and the UHF RFID tag are located at the same level, $P_L(h_0)$ represents the reference path loss when the height difference between the tag reader and the UHF RFID tag is $h_0$, $h_0$ is the default setting value, $X_\theta$ is the average value of θ, the standard difference θ describes the shadow effect, which is a random variable conforming to the Gaussian distribution, and OLF is the loss caused by an obstacle during propagation process of the electromagnetic wave.

In order to increase the spatial correlation of the path loss evaluation model, the UHF RFID tags in the front surface location region are distributed in a matrix, such as a 3*3 matrix. The path loss of each UHF RFID tag in the matrix has been specifically described in the foregoing embodiment, which will not be reiterated here.

In summary, in the method and the system for vehicle-loading warehousing asset management based on the UHF RFID path loss model of the disclosure, based on the propagation theory of geometric characteristics of direct, refractive, diffractive, and scattered electromagnetic waves, the height difference factor and the obstacle loss factor are introduced to construct the UHF RFID path loss model. The disclosure is based on the two-dimensional spatial geometric characteristics of the vehicle-loading warehousing, whose factors are more abundant compared with the traditional path loss evaluation model. Further, the UHF RFID tag attachment region is distributed in a matrix, which increases the spatial correlation of the path loss evaluation model. The path loss is the superposition of direct, refraction, diffraction, and scattering transfer functions, the height difference factor, and the obstacle loss factor. The path loss model optimizes the wireless sensing path of the RF tag, which can effectively evaluate the optimal location of the UHF RFID tag, which can effectively evaluate the optimal location of the UHF RFID tag, improve the inventory efficiency of vehicle-loading warehousing assets, and eventually achieve accurate and rapid transmission of supply information to implement goals such as the dynamic management and automatic identification of supply.

It should be understood that persons skilled in the art may make improvements or changes based on the above descriptions, and all of the improvements and changes should fall within the protection scope of the appended claims of the disclosure.

What is claimed is:

1. A method for vehicle-loading warehousing asset management based on an ultra-high frequency (UHF) radio frequency identification (RFID) path loss model, comprising:

emitting an electromagnetic wave by a tag reader, wherein the electromagnetic wave is diffracted, reflected, and scattered when passing through a warehousing vehicle hood, and the electromagnetic wave is emitted and scattered through a ground;

receiving an electromagnetic wave of a direct path and electromagnetic waves of a ground reflection path, a ground scattering path, a hood diffraction path, a hood reflection path, and a hood scattering path emitted by the tag reader by a UHF RFID tag attached to a front surface location region of assets loaded by a warehousing vehicle;

reading tag information of the UHF RFID tag by the tag reader;

constructing a transfer function of a tag receiving signal according to the tag information, and constructing a path loss function during a UHF RFID tag sensing electromagnetic wave process according to the transfer function, wherein the path loss function comprises each path loss and obstacle loss in a path when the tag reader and the UHF RFID tag are located at different levels; and calculating the path loss according to the constructed path loss function, and obtaining a location of the UHF RFID tag, wherein a constructed transfer function $G(f, d_i)$ of the tag receiving signal is:

$$G(f,d_i)=G_1(f,d_d)+G_{21}(f,d_{gr})+G_{22}(f,d_{gs})+G_{31}(f,d_{cd})+G_{32}(f,d_{cr})+G_{33}(f,d_{cs})$$

where, $G_1(f, d_d)$ is the transfer function of the direct path, and $d_d$ is a propagation distance of the direct path; $G_{21}(f, d_{gr})$ is the transfer function of the ground reflection path, and $d_{gr}$ is a propagation distance of the ground reflection path; $G_{22}(f, d_{gs})$ is the transfer function of the ground scattering path, and $d_{gs}$ is a transmission distance of the ground scattering path; $G_{31}(f, d_{cd})$ is the transfer function of the hood diffraction path, $d_{cd}$ is a transmission distance of the hood diffraction path, $G_{32}(f, d_{cr})$ is the transfer function of the hood reflection path, $d_{cr}$ is a transmission distance of the hood reflection path, $G_{33}(f, d_{cs})$ is the transfer function of the hood scattering path, and $d_{cs}$ is a transmission distance of the hood scattering path.

2. The method according to claim 1, wherein the UHF RFID tag is an active UHF radio frequency (RF) tag.

3. The method according to any one of claim 2, wherein the UHF RFID tag in the front surface location region is distributed in a matrix.

4. The method according to claim 1, wherein the constructed path loss function is:

$$P_L(H-H_c)=P_L(h_0)+10nlg[(H-H_c)/h_0]+X_\theta+\Sigma OLF$$

where, H is a height of the tag reader from the ground, Hc is a height of the UHF RFID tag from the ground, n represents a path loss coefficient when the tag reader and the UHF RFID tag are located at a same level, $P_L(h_0)$ represents a reference path loss when a height difference between the tag reader and the UHF RFID tag is $h_0$, $h_0$ is a default setting value, $X_\theta$ is an average value of θ, a standard difference θ describes a shadow effect, which is a random variable conforming to a Gaussian distribution, and OLF is a loss caused by an obstacle during a propagation process of the electromagnetic wave.

5. The method according to any one of claim 1, wherein the UHF RFID tag in the front surface location region is distributed in a matrix.

6. A system for vehicle-loading warehousing asset management based on a UHF RFID path loss model, comprising:

a tag reader, emitting an electromagnetic wave and reading tag information of a UHF RFID tag, wherein the electromagnetic wave is diffracted, reflected, and scattered when passing through a warehousing vehicle hood, and the electromagnetic wave is emitted and scattered through a ground;

the UHF RFID tag, attached to a front surface location region of assets loaded by a warehousing vehicle and receiving an electromagnetic wave of a direct path and electromagnetic waves of a ground reflection path, a ground scattering path, a hood diffraction path, a hood reflection path, and a hood scattering path emitted by the tag reader;

a signal transfer function construction unit, configured to construct a transfer function of a tag receiving signal according to the tag information;

a path loss function construction unit, configured to construct a path loss function during a UHF RFID tag sensing electromagnetic wave process according to the transfer function, wherein the path loss function comprises each path loss and obstacle loss in a path when the tag reader and the UHF RFID tag are located at different levels; and a UHF RFID tag location calculation unit, configured to calculate the path loss according to the constructed path loss function, and then calculate a location of the UHF RFID tag according to the path loss, wherein a transfer function $G(f, d_i)$ of the tag receiving signal constructed by the signal transfer function construction unit is:

$$G(f,d_i)=G_1(f,d_d)+G_{21}(f,d_{gr})+G_{22}(f,d_{gs})+G_{31}(f,d_{cd})+G_{32}(f,d_{cr})+G_{33}(f,d_{cs})$$

where, $G_1(f, d_d)$ is the transfer function of the direct path, and $d_d$ is a propagation distance of the direct path; $G_{21}(f, d_{gr})$ is the transfer function of the ground reflection path, and $d_{gr}$ is a propagation distance of the ground reflection path; $G_{22}(f, d_{gs})$ is the transfer function of the ground scattering path, and $d_{gs}$ is a transmission distance of the ground scattering path; $G_{31}(f, d_{cd})$ is the transfer function of the hood diffraction path, $d_{cd}$ is a transmission distance of the hood diffraction path, $G_{32}(f, d_{cr})$ is the transfer function of the hood reflection path, $d_{cr}$ is a transmission distance of the hood reflection path, $G_{33}(f, d_{cs})$ is the transfer function of the hood scattering path, and $d_{cs}$ is a transmission distance of the hood scattering path.

7. The system according to claim 6, wherein the UHF RFID tag is an active UHF RF tag.

8. The system according to any one of claim 7, wherein the UHF RFID tag in the front surface location region is distributed in a matrix.

9. The system according to claim 6, wherein the path loss function constructed by the path loss function construction unit is:

$$P_L(H-H_c)=P_L(h_0)+10nlg[(H-H_c)/h_0]+X_\theta+\Sigma OLF$$

where, H is a height of the tag reader from the ground, Hc is a height of the UHF RFID tag from the ground, n represents a path loss coefficient when the tag reader and the UHF RFID tag are located at a same level, $P_L(h_0)$ represents a reference path loss when a height difference between the tag reader and the UHF RFID tag is $h_0$, $h_0$ is a default setting value, $X_\theta$ is an average value of θ, a standard difference θ describes a shadow effect, which is a random variable conforming to a Gaussian distribution, and OLF is a loss caused by an obstacle during a propagation process of the electromagnetic wave.

10. The system according to any one of claim 6, wherein the UHF RFID tag in the front surface location region is distributed in a matrix.

\* \* \* \* \*